United States Patent [19]

Ha et al.

[11] Patent Number: 5,609,990

[45] Date of Patent: Mar. 11, 1997

[54] OPTICAL RECORDING DISK HAVING A SEALCOAT LAYER

[75] Inventors: Chau T. Ha, St. Paul; William M. Lamanna, Stillwater, both of Minn.

[73] Assignee: Imation Corp., St. Paul, Minn.

[21] Appl. No.: 385,681

[22] Filed: Feb. 8, 1995

[51] Int. Cl.$^6$ .................................................... G11B 7/24
[52] U.S. Cl. .................. 430/270.11; 430/945; 428/64.4; 428/65.1
[58] Field of Search ...................................... 430/271, 272, 430/273, 945, 495, 270.11; 369/283, 284; 428/64.4, 64.6, 65.1, 64.2

[56] References Cited

U.S. PATENT DOCUMENTS

| | | | |
|---|---|---|---|
| 3,341,497 | 9/1967 | Sherman et al. | 260/72 |
| 3,787,351 | 1/1974 | Olson | 260/40 |
| 4,013,696 | 3/1977 | Babbitt et al. | 428/412 |
| 4,315,269 | 2/1982 | Bloom et al. | 346/135.1 |
| 4,795,764 | 1/1989 | Alm et al. | 521/107 |
| 4,806,571 | 2/1989 | Knobel et al. | 421/107 |
| 4,814,257 | 3/1989 | Galloway | 430/278 |
| 4,976,741 | 12/1990 | Hisamoto et al. | 8/115.6 |
| 5,098,446 | 3/1992 | Rodriguez et al. | 8/94 |
| 5,176,943 | 1/1993 | Woo | 428/64 |
| 5,296,263 | 3/1994 | Soga et al. | 427/130 |

FOREIGN PATENT DOCUMENTS

| | | |
|---|---|---|
| 0210638 | 2/1987 | European Pat. Off. . |
| 0538866 | 4/1993 | European Pat. Off. . |
| 52-041182A | 3/1977 | Japan . |
| 57-42741 | 3/1982 | Japan . |
| 3-160642 | 7/1991 | Japan . |
| 3-172358 | 7/1991 | Japan . |
| 4-149280 | 5/1992 | Japan . |
| 4-180970 | 6/1992 | Japan . |
| 4-264167 | 9/1992 | Japan . |
| 4-306266 | 10/1992 | Japan . |
| 4-288312 | 10/1992 | Japan . |
| 5-105726 | 4/1993 | Japan . |
| 6-136355 | 5/1994 | Japan . |
| WO93/26002 | 12/1993 | WIPO . |

OTHER PUBLICATIONS

Fluorochemical Surfactants, *Paint and Varnish Production*, Mar. 1972, pp. 27–32.

*Primary Examiner*—Janet C. Baxter
*Assistant Examiner*—John A. McPherson

[57] ABSTRACT

An optical recording disk having a sealcoat layer provided on at least one surface of the disk, wherein the sealcoat layer is a cured composition obtained from ingredients comprising a radiation-curable component; a nonionic perfluoro surfactant; and a radiation curable silicone-containing compound. Optionally the sealcoat layer is a cured composition of ingredients further comprising an anticorrosion agent and photoinitiator.

23 Claims, 1 Drawing Sheet

OPTICAL RECORDING DISK HAVING A SEALCOAT LAYER

FIELD OF THE INVENTION

The present invention relates generally to the use of sealcoat compositions, such as for use on optical media, and more specifically to sealcoat compositions that comprise little or no solvent.

BACKGROUND OF THE INVENTION

Optical recording media typically comprise an optical recording layer provided on a substrate. For media such as magneto optic recording media and WORM (write-once-read-many) optical recording media, the optical recording layer generally contains a thin film rare earth transition metal alloy such as gadolinium-cobalt (Gd-Co), gadolinium-iron (Gd-Fe), terbium-iron (Tb-Fe), dysprosium-iron (Dy-Fe), Gd-Tb-Fe, Tb-Dy-Fe, Tb-Fe-Co, terbium-iron-chromium (Tb-Fe-Cr), gadolinium-iron-bismuth (Gd-Fe-Bi), Gd-Co-Bi, gadolinium-iron-tin (Gd-Fe-Sn), Gd-Fe-Co, Gd-Co-Bi, or Gd-Dy-Fe. Such alloys are described, for example, in U.S. Pat. No. 4,822,675. For media such as compact disks, the optical recording layer may be a layer of reflective material, for example an aluminum or aluminum alloy, having a patterned, information-bearing surface.

Many of the materials which are suitable for the optical recording layer of optical disks react strongly with oxygen and other elements which may be present in the environment in which optical recording media are used. Furthermore, the substrate itself may contain impurities which react with the optical recording layer. Thus, transparent dielectric films may be deposited on one or both sides of the optical recording layer to protect it. Such dielectric films are described, for example, in U.S. Pat. Nos. 4,833,043 and 4,917,970.

Optionally, a reflective layer may be incorporated into optical recording media so that incident light that passes through the optical recording layer a first time, is reflected, and passes back through the optical recording layer a second time. Such reflection increases the magneto optic rotation of incident light because the so-called Faraday effect is added to the so-called Kerr effect.

The reflective layer may be incorporated into a magnetic recording medium such that the optical recording layer is interposed between the substrate and the reflective layer. For such media, transparent substrates are used so that incident light passes first through the substrate, then passes through the optical recording layer, and then is reflected by the reflective layer back through the optical recording layer. Such media are known as substrate incident media. Alternatively, when the optional reflective layer is disposed between the substrate and the optical recording layer, the read and write beams will not be directed through the substrate. Such a medium is known as an air incident medium, although generally there is at least one layer between the optical recording layer and the air.

For substrate incident media, the reflective layer is exposed to the environment, and therefore is subject to physical damage such as scratches, abrading, corrosion, and the like. For air incident media, the optical recording layer is exposed to the environment, and therefore is subject to physical damage such as scratches, abrading, corrosion, and the like. In either case, the optical recording layer or the reflective layer must be protected from such physical damage.

A "sealcoat" layer can be coated directly onto either the optical recording layer or the reflective layer to form a barrier protecting these layers from physical damage and the environment. Sealcoat compositions must satisfy stringent requirements in order to be suitable for use in optical recording media. Cured sealcoat layers should be abrasion resistant and compositionally stable so that the cured sealcoat layer maintains its protective properties for long periods of time. Preferably, a sealcoat layer will also protect an optical recording layer from corrosion.

The cured sealcoat is produced from an uncured admixture of ingredients which are first coated onto the optical recording media substrate, then cured. One method of applying sealcoats to an optical recording media substrate is by a spin coating technique. The spin coating technique requires that the viscosity of the uncured sealcoat composition be relatively low. For instance, to obtain a sealcoat layer of uniform thickness by the spin coating technique, the sealcoat composition preferably must have a viscosity of, for example, 100 centipoise or less at 25 C. The ingredients of conventional sealcoat compositions, however, may be of a relatively higher molecular weight and surface tension, causing admixtures of these ingredients to be too viscous to spin coat. One method by which the viscosity of these admixtures can be reduced is by adding a solvent to the admixture. Solvents, however, are generally disfavored because of their negative health and environmental effects, and attendant higher material and processing costs.

SUMMARY OF THE INVENTION

The present invention relates to a sealcoat composition having a viscosity which is sufficiently low at room temperature that the uncured admixture can be spin coated without the need for solvents. This composition provides a sealcoat that has superior anti-abrasive and cosmetic qualities. Preferred embodiments also provide excellent corrosion resistance to the substrate of the sealcoat layer.

An aspect of the present invention is an optical recording disk having a sealcoat layer provided on at least one surface of the disk, wherein the sealcoat layer is a cured composition obtained from ingredients comprising a radiation-curable component; a nonionic perfluoro surfactant; and a radiation-curable silicone-containing compound. In a preferred embodiment, the radiation curable component of the present invention comprises a (meth)acrylate-functional diluent; a multi-functional (meth)acrylate monomer comprising three or more (meth)acrylate groups; and a multi-functional (meth)acrylate oligomer.

DESCRIPTION OF THE PREFERRED EMBODIMENTS OF THE INVENTION

Figure 1:
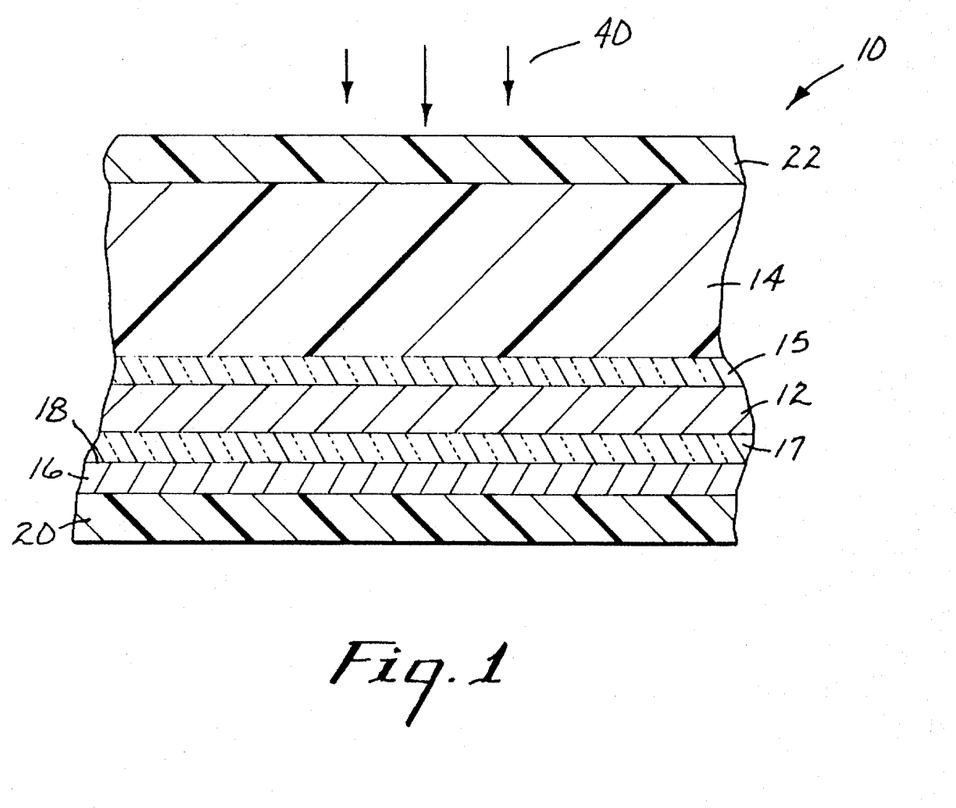
FIG. 1 is a schematic cross-section of an optical recording disk comprising a sealcoat layer.

FIG. 1 shows a greatly enlarged schematic cross-section through a portion of an illustrative substrate incident magneto optic ("MO") recording disk 10 of the present invention. It is to be understood, however, that the compositions of the present invention are not limited solely to use on MO media, but rather are suitable for use on a wide variety of materials. For example, in addition to being used with MO disks, the sealcoat compositions of the present invention are particularly suitable for use with other kinds of optical recording media such as compact disks, CD-ROM, CD-R,

WORM (i.e., write-once-read-many) media, and the like. Further, although the present application will emphasize the use of the inventive coating in a sealcoat layer for optical recording media, these same ingredients may also be used as an effective hard coat layer.

Referring now to FIG. 1, an optical recording layer 12 is provided on a transparent substrate 14. A film 16 having a reflective surface 18 is disposed to reflect incident light 40 which will have been transmitted through the magneto optic layer 12 a first time back through the optical recording layer 12 a second time. A protective sealcoat layer 20 of the present invention is disposed over the film 16 to protect the optical recording layer 12 from the environment. Optionally, transparent dielectric layers 15 and 17 may be disposed on one or both sides of the optical recording layer 12. As is known in the art, such dielectric layers enhance the optical signal from the optical recording layer 12 and also protect the optical recording layer 12 from oxidation or corrosion due to heat, humidity, or chemical reactions with impurities, such as moisture. A hard coat layer 22 is optionally provided over the substrate 14 to protect the substrate 14 from physical damage.

The substrate 14, optical recording layer 12, film 16, hard coat layer 22, and the dielectric layers 15 and 17 can be of a type known in the art. The sealcoat layer 20 comprises a radiation-curable component, a nonionic perfluoro surfactant, and a radiation-curable silicone-containing compound.

The radiation-curable component is a component that cures upon exposure to radiation (e.g., ultraviolet radiation, electron beam radiation, etc.). Preferably, the radiation-curable component is UV-curable. Useful radiation-curable components must be capable of being combined with the other components of the present invention to provide an uncured sealcoat admixture that provides good wetting and flow characteristics, that allows for a relatively fast cure, and that has a viscosity sufficiently low to be spin coated. For example, the viscosity of an admixture comprising a radiation-curable component, a nonionic perfluoro surfactant, and a radiation-curable silicone-containing compound is preferably no higher than about 100 centipoise at a temperature of 25 C. If the viscosity of the solution is too high, the solution may be unsuitable for use with the spin coating techniques which are most desirably used to apply the uncured sealcoat composition to an optical recording media substrate prior to curing. These uncured radiation-curable materials must also, upon being cured, provide abrasion resistance and provide good adhesion to the reflective layer.

The radiation-curable component of the present invention can be comprised of one or more monomeric and/or oligomeric radiation-curable components. Each monomeric or oligomeric component may comprise one or more reactive vinyl unsaturated moiety that will polymerize upon being exposed to suitable radiation. Generally, radiation-curable components suitable for the practice of the present invention include (meth)acrylate functional monomers and oligomers having the general formula wherein $R^A$ is preferably hydrogen or $CH_3$, and y is preferably in the range from about 1 to 6. The precise nature of Z is not critical, however Z has a valency y. Representative Z groups include those that comprise, for example, urethanes, polyurethanes, esters, polyesters, oxyalkylene groups, epoxies, alkyl groups, aryl-containing groups, and allyl-containing groups, etc., any of which can be straight, branched, cyclic, aromatic, saturated, or unsaturated.

Preferably, the radiation-curable component of the present invention comprises a (meth)acrylate-functional diluent, a multi-functional (meth)acrylate monomer comprising three or more (meth)acrylate groups, and a multi-functional (meth)acrylate oligomer.

For the purposes of the present invention, (meth)acrylate-functional diluents, also referred to herein as "reactive diluents," are relatively low molecular weight mono- or di-functional, non-aromatic, (meth)acrylate monomers; i.e., y in formula II equals 1 or 2. These relatively low molecular weight reactive diluents are advantageously of a relatively low viscosity, e.g., less than about 30 centipoise (cps) at 25 C. Di-functional, non-aromatic (meth)acrylates are generally preferred over mono-functional non-aromatic (meth)acrylates because di-functional non-aromatic (meth)acrylates allow for quicker cure time. Preferred reactive diluents include 1,6-hexanediol di(meth)acrylate (HDODA from Radcure), tripropylene glycol di(meth)acrylate, isobornyl (meth)acrylate (IBOA, Radcure), 2-(2-ethoxyethoxy) ethyl (meth)acrylate (sold under the trade name Sartomer 256 from SARTOMER Company, Inc. of Exton, Pa.), tetrahydrofurfuryl (meth)acrylate (Sartomer 285), polyethylene glycol di(meth)acrylate (Sartomer 344), tripropylene glycol di(meth)acrylate (Radcure), neopentyl glycol dialkoxy di(meth)acrylate, polyethyleneglycol di(meth)acrylate, and mixtures thereof.

Another radiation-curable component useful in the practice of the present invention is the class of multifunctional (meth)acrylate monomers comprising three or more (meth)acrylate groups; i.e. where y in formula I is 3 or greater. Multifunctional (meth)acrylate monomers are useful in the practice of the present invention because they add abrasion resistance to the sealcoat layer. Preferred multifunctional (meth)acrylate monomers comprising three or more (meth)acrylate groups include trimethylpropane tri(meth)acrylate (TMPTA), pentaerythritol tri(meth)acrylate, pentaerythritol tetra(meth)acrylate, ditrimethylolpropane tri(meth)acrylate (Sartomer 355), dipentaerythritol penta(meth)acrylate (Sartomer 399), dipentaerythritol hydroxy penta(meth)acrylate, glyceryl propoxy tri(meth)acrylate, trimethylolpropane tri(meth)acrylate, and mixtures thereof.

Another useful radiation-curable component of the present invention is the class of multifunctional (meth)acrylate oligomers having two or more (meth)acrylate groups, and having an average molecular weight ($M_w$) in the range from about 400 to 2000. Preferred multi-functional (meth)acrylate oligomers include polyester (meth)acrylates, polyurethane (meth)acrylates, and (meth)acrylated epoxy (meth)-acrylates. (Meth)acrylated epoxy (meth)acrylates are most preferred because they tend to have a relatively low viscosity and therefore allow a more uniform layer to be applied by the spin coating method. Specifically, preferred multifunctional (meth)acrylate oligomers include those commercially available from UCB Radcure, Inc. of Smyrna Ga. under the trade name Ebecryl (Eb): Eb40 (tetrafunctional acrylated polyester oligomer), Eb80 (polyester tetrafunctional (meth)acrylate oligomer), Eb81(multifunctional (meth)acrylated polyester oligomer), Eb600 (bisphenol A epoxy di(meth)acrylate), Eb605 (bisphenol A epoxy di(meth)acrylate diluted with 25% tripropylene glycol di(meth)acrylate), Eb639 (novolac polyester oligomer), Eb2047 (trifunctional acrylated polyester oligomer), Eb3500 (difunctional bisphenol-A oligomer acrylate), Eb3604 (multifunctional polyester acrylate oligomer), Eb6602 (trifunctional aromatic urethane acrylate oligomer), EBB301 (hexafunctional aliphatic urethane acrylate), Eb8402 (difunctional aliphatic urethane acrylate oligomer), and mixtures thereof. Of these, the most preferred are, Eb 600, Eb605, EB80, and Eb81.

Most preferably the radiation-curable component of the present invention comprises multiple radiation curable components. (Meth)acrylate-functional diluents are preferably present in the radiation-curable component in amounts ranging from about 20 to 40 parts by weight (pbw), based on 100 pbw of radiation-curable material. Multifunctional (meth)-acrylate monomers are preferably present in amounts ranging from about 25 to 55 pbw, based on 100 pbw of total radiation-curable component. And, multifunctional (meth)-acrylate oligomers, preferably having a molecular weight in the range from 400 to 2000 are preferably present in the radiation-curable component of the present invention in an amount in the range from about 10 to 30 parts by weight, based on 100 pans of radiation curable component.

Nonionic suffactants useful in the practice of the present invention can be any monomer, oligomer, or copolymer that will facilitate uniform coating of the sealcoat composition. Preferably the nonionic surfactant comprises a fluorinated group, and most preferalby the nonionic surfactant comprises a perfluorinated group.

One class of preferred nonionic surfactants are those that comprise a polyoxyalkylene segment. Of these, nonionic surfactants that comprise polyoxyethylene segment are especially preferred. Surfactants comprising polyoxyalkylene segments, e.g., polyoxymethylene, polyoxyethylene, polyoxypropylene, etc., preferred in the practice of the present invention, can be represented by one or both of the following general formulas:

$$R^5(C_yH_{2y}O)_xR^6 \quad \text{(II.a)}$$

$$R^5O(C_yH_{2y}O)_xR^6 \quad \text{(II.b)}$$

wherein each y is independently in the range from 1 to 20, preferably from 1 to 8, most preferably 2; each x represents an average degree of polymerization and independently in the range from 1 to 50, preferably from 10 to 20; and $R^5$ can be a branched, cyclic, straight, saturated or unsaturated fluorinated carbon chain, including perfluoroalkyl groups, perfluoroalkylene groups, and the like. An occasional carbon-bonded hydrogen atom, bromine atom, or chlorine atom may be present; where present, however, these atoms preferably are present not more than once for every two carbon atoms. Preferably $R^5$ is $F_{2n+1}C_n-$ or $F_{2n-1}C_n-$, with an average n in the range from 1 to 20. $R^6$ in formulas III(a-b) is hydrogen, a straight, branched, cyclic, saturated or unsaturated alkyl group, a straight, branched, cyclic, saturated or unsaturated oxy-alkyl group, a (meth)acrylate group, or other similar organic molecules, including any of those within the definition of $R^5$. For example, $R^6$ may be selected from organic groups such as alkyl groups, phenyl groups, naphthyl groups, alkylphenyl groups, alkylamino groups, alkenylamino groups, alkylthio groups, perfluoroalkenyl or perfluoroalkyl groups, etc. Preferably $R^6$ is hydrogen or an alkyl group containing from 1 to 10 carbon atoms. In formulas III(a-b), some of the hydrogen atoms of the repeating polyoxyalkylene group may also be replaced with alkyl groups such as $-CH_3$.

Where $R^5$ is the perfluorinated group $F_{2n+1}C_n-$, the nonionic perfluoro surfactant according to formula II.a has the formula $$F_{2n+1}C_n(C_yH_{2y}O)_xR^6 \quad \text{(II.a.1)}$$

$R^6$ is preferably hydrogen or an alkyl group, n is preferably in the range from 1 to 12, y is preferably 2, and x is preferably in the range from 1 to 50. Most preferably, $R^6$ is hydrogen, x average equals 10, y is 2, and n equals 8; formula II.a.1 then becomes $$F_{17}C_8(CH_2CH_2O)_{10}H \quad \text{(II.a.2)}$$

which is commercially available from DuPont, under the trade name ZONYL FSN.

Where $R^5$ is a perfluoroalkylene group $F_{2n-1}C_n-$, and $R^6$ is $-CH_3$, nonionic surfactants according to formula II.b include those having the general formula $$F_{2n-1}C_nO(C_yH_{2y}O)_xCH_3 \quad \text{(II.b.1)}$$

where n is preferably from 3–18, most preferably 9; x is from 1 to 50, preferably from about 10–20, and y preferably is 1 or 2. Where $R^5$ is a branched perfluorinated alkenyl group $R^b$, this surfactant becomes:

$$R^bO(CH_2CH_2O)_xCH_3 \quad \text{(II.b.2)}$$

where $R^b$ is preferably derived from mono-unsaturated tetrafluoroethylene or hexafluoropropylene oligomers, and is most preferably a branched $F_{17}C_9-$ group derived from hexafluoropropylene trimer, and x average is about 16, preferably 16.3.

Surfactants comprising polyoxyethylene segments can be synthesized by the dehydrofluorinating condensation between a perfluoroalkene and a hydroxy compound having a polyoxyethylene chain. The reaction may be carried out in the presence of a suitable base, such as potassium carbonate, in a reaction solvent such as acetone, methyl ethyl ketone, etc., at about room temperature to 100 C. A general description of the synthesis of these compounds can be found in U.S. Pat. No. 4,272,615.

Another class of nonionic surfactant preferred in the practice of the present invention includes vinyl (meth)acrylate monomers comprising a fluorinated group, generally represented by formula III:

(III)

wherein $X^1$ is a divalent linking group such as an alkyl group, preferably $-CH_2-$, or $-CH_2CH_2-$, or a polyether group, preferably $-(OCH_2CH_2)_x-$ wherein x (average) is preferably in the range from 1 to 20; $R^A$ is preferably hydrogen or $CH_3$; and $R^7$ is a fluorinated group, preferably, a fluorochemical sulfonamide.

Monomers of formula III in which $R^7$ is a fluorochemical sulfonamide may be represented as:

(III.1)

wherein n is preferably from about 4 to 16, most preferably 8; $R^8$ is preferably hydrogen or a lower alkyl of from 1–12 carbon atoms such as $-CH_3$, $-CH_2CH_3$ and the like, most preferably $-CH_2CH_3$ or $-CH_2CH_2CH_2CH_3$; $X^1$ is a divalent linking group such as an alkyl group, preferably $-CH_2-$, or $-CH_2CH_2-$, or a polyether group, preferably $-(OCH_2CH_2)_x-$ wherein x (average) is preferably in the range from 1 to 20; and $R^A$ is preferably hydrogen or a methyl group. Specific monomers according to formula III.1 include, for example:

(III.1.1)

(III.1.2)

(III.1.3)

A further class of preferred nonionic surfactant includes polymers and copolymers comprising pendant perfluorinated groups. A particularly preferred copolymer comprising pendant perfluorinated groups is obtained by copolymerizing about 60–95, preferably 70 parts by weight of a nonfluorinated vinyl monomer having the general formula wherein x, y, and z, are preferably chosen to provide an average molecular weight in the range from about 500 to 10000, preferably about 2200; x, y, and z, are preferably in the range from about 7 to 17, 16 to 26, and 7 to 17, respectively, and the ratio of (x+z):y is in the range from about 4:6 to 6:4; with about 5 to 40, preferably 30 parts by weight of a vinyl monomer comprising a fluorinated group having the formula Another particularly preferred copolymer comprising pendant perfluorinated groups can be obtained by copolymerizing about 60–95, preferably 70 parts by weight of a nonfluorinated vinyl monomer having the formula wherein x (average) is preferably in the range from about 10 to 25, preferably from about 12–18, and is chosen to provide an average molecular weight in the range from about 500 to 1100, preferably about 600 to 900, with about 5 to 40, preferably 30 parts by weight of a fluorinated vinyl monomer having the formula

Copolymers comprising pendant fluorinated groups may be prepared by free-radical polymerization methods known in the art. Those methods include but are not limited to bulk, solution, emulsion and suspension polymerization methods such as those which have been described in U.S. Pat. No. 3,341,497.

A final type of preferred nonionic surfactant are the nonionic fluorinated surfactants described in U.S. Pat. No. 5,176,943 (Woo) columns 5–6. Of these, the most preferred nonionic fluorinated suffactants are those having the general formula (IV)

wherein n is from about 4 to 12; $R^9$ is H or a lower alkyl of from 1 to 12 carbon atoms, preferably H or $CH_3$, $R^{10}$ is hydrogen or a lower alkyl of 1–12 carbon atoms, such as H, —$CH_3$, —$CH_2CH_3$, etc., and x represents an average degree of polymerization in the range from about 1 to 20. Most preferred embodiments of formula V are shown in formulas V.1 and V.2:

(IV.1)

(IV.2)

wherein x is preferably in the range from about 5 to 8, and is most preferably from about 7.2 to 8.

The uncured sealcoat composition of the present invention may also optionally comprise a silicone-containing compound. Preferably, the silicone-containing compound may be radiation-curable; i.e., it may comprise one or more vinyl unsaturated moieties that will copolymerize with the radiation-curable component upon being exposed to suitable radiation. By copolymerizing with the radiation-curable component, the radiation-curable silicone-containing compound will become an integral part of the cured sealcoat layer, thus eliminating silicone transfer and silicone contamination problems over time. Preferably, the vinyl unsaturated group in the radiation-curable silicone-containing compound is a (meth)acrylate group and the radiation-curable silicone-containing compound is a silicone-containing (meth)acrylate compound.

As another advantage, radiation-curable silicone-containing compounds may also be selected to control their compatibility with the other components of the sealcoat composition. For instance, radiation-curable silicone-containing compounds useful in the practice of the present invention preferably comprise a polyoxyalkylene segment (e.g., polyoxymethylene, polyoxyethylene, polyoxypropylene, etc.)that is incorporated into the backbone of the radiation-curable silicone-containing compound. The polyoxyalkylene segment provides an organic segment which enhances the compatibility of the radiation-curable silicone-containing compound with the acrylic-based radiation-curable component, and allows the radiation-curable silicone-containing compound to be soluble in the radiation-curable component. In the absence of the polyoxyalkylene segment, the radiation-curable silicone-containing compound and the acrylate-based radiation-curable component may tend to form two phases when combined, leading to haze, orange peel, craters, ghosting, or other surface imperfections upon coating. Preferably, the polyoxyalkylene segment is a polyoxypropylene segment.

One class of preferred radiation-curable silicone-containing compounds are the silicone-containing (meth)acrylate compounds having the general formula (V)

wherein $R^A$ is preferably H or $CH_3$, $R^S$ is an alkyl group or hydrogen, A is a hydroxy-containing divalent linking group, x is in the range from 1–9, preferably from 4–7; m, n, and p, are all independently in the range from 1 to 10, preferably m is 1, n is 1, y is in the range from 1–30, and p is 3.

Where A is $C_rH_{2r-1}$ further comprising a hydroxy group pendant from any of the carbon atoms, formula V becomes

(V.1)

wherein $R^S$, $R^A$, x, y, m, n, and p are defined as above, and r is in the range from 1 to 10, preferably r is 3, and the silicone-containing (meth)acrylate compound is a polydimethylsiloxane. The silicone-containing (meth)acrylate compound is most preferably a polydimethylsiloxane (meth)acrylate having the formula:

(V.2)

wherein $R^S$ and $R^A$ are as defined above, x is in the range from 1–9, preferably from 4–7, and y is in the range from 1–30, preferably from 1–20. Most preferably x=4, y=1, and $R^S$ is —$CH_3$ as in the following formula:

(V.2.1)

wherein $R^A$ is H or $CH_3$. This polydimethylsiloxane (meth)acrylate is commercially available from Goldsmith AG, of Essen, Germany under the trade name RC711.

The sealcoat layer of the present invention may contain various amounts of the nonionic perfluoro surfactant, the radiation-curable component, and the radiation-curable silicone-containing compound. Specifically, we have found that using from about 0.5 to 4 pans by weight (pbw), preferably from about 0.5 to 2 pbw, of the nonionic perfluoro surfactant; from about 85 to 99 pbw, preferably from about 87 to 94 pbw, of the radiation-curable component; and from about 0.5 to 5 pbw, preferably from about 0.5 to 3 pbw, of the radiation-curable silicone-containing compound, based on 100 pbw of total sealcoat, is suitable.

The sealcoat layer of the present invention may optionally comprise further ingredients, for example photoinitiators and/or anticorrosion agents to prevent corrosion of the optical recording layer. In the practice of the present invention a photoinitiator facilitates the curing of the radiation curable component. Examples of useful photoinitiators include, but are not limited to: Darocure 1173 and Darocure 4265, commercially available from Ciba-Geigy, Ardsley, N.Y.; and other photoinitiators such as Irgacure 184, and Irgacure 907; also available from Ciba-Geigy. Preferred photoinitiators are those that comprise a phosphine oxide group, for example 2,4,6-[trimethylbenzoyldiphenyl phosphine]oxide, bis(2,6-dimethyoxybenzoyl)-2,4,4-trimethylpentylphosphine oxide, triphenylphosphine, triphenylphosphite, and mixtures thereof. The photoinitiator can be present in amounts in the range for 0.25–15 parts by weight, and is preferably present in the range from about 4–12 pbw based on 100 parts by weight of sealcoat ingredients.

Anticorrosion agents useful in the practice of the present invention enhance a sealcoat's ability to inhibit corrosion of the optical recording layer. While not wishing to be bound by theory, it is believed that any basic compound (e.g., an amine) will be effective as an anticorrosion agent because it will neutralize any residual acid in the acrylic-based radiation-curable component. Examples of preferred anticorrosion agents include, but are not limited to tributyl amine, triethyl amine, trioctyl amine, n-butyl amine, n-methyl diethanol amine, 1-butylpyrrolidine, ethylene diamine, etc. Preferably the anticorrosion agent is present in an amount from about 1 to 7 pbw, based on 100 parts sealcoat ingredients.

Preferably, the sealcoat layers of the present invention are prepared from uncured admixtures of ingredients which are then applied to optical recording media substrates, such as the optical recording layer of the magneto optic recording disk 10 of FIG. 1, using a spin coating technique, and then cured by UV (ultraviolet) radiation to form a sealcoat layer.

Admixtures of the present invention suitable for spin-coating generally contain ingredients comprising a radiation-curable component; a nonionic perfluoro suffactant, a radiation-curable silicone-containing compound, and optionally, a photoinitiator and an anticorrosion agent. Advantageously, the viscosity of these admixtures is sufficiently low to allow spin coating even without any solvent being added to the composition.

Spin coating allows an extremely uniform coated layer having a thickness of only 0.5 to 20 μm, preferably 5 to 20 μm, more preferably 5 to 15 μm, most preferably from 7 to 10 μm, to be easily and quickly formed. According to the spin coating technique, an admixture of uncured components of the sealcoat layer is prepared. The admixture is delivered onto the magneto optic disk 10 using a conventional spin coating apparatus. Such an apparatus generally includes a dispensing needle, a syringe, and a pump. Dispensing the sealcoat admixture onto the disk may involve either manually or automatically dispensing the fluid by means of a syringe and a needle. Preferably, the disk to be coated is pro-cleaned with ionized air prior to spin-coating. For admixtures having a viscosity in the range from 5 to 100 centipoise, a needle pressure of 5 to 20 psi (25 to 103 cm Hg) delivers a suitable amount of the admixture onto the center of a disk in about 2 seconds when the disk is spinning at 30 to 50 rpm. Preferably, an in-line filter (0.1 to 2 μm) is used to remove particles from the admixture before the admixture is allowed to pass through the dispensing noodle. After delivery, a high spinoff speed of 1800 to 3500 rpm for 3 to 5 seconds disperses the solution into a thin, uniform coating.

The wet coating is then cured with a suitable form of radiation. Preferably, curing occurs in a chamber fitted with an exhaust fan. Typically, the exhaust fan is operated during curing in order to remove low boiling, volatile components from the chamber.

The uncured sealcoat composition of the present invention may be cured using any suitable form of radiation such as electron beam radiation or ultraviolet radiation. It is preferred that the composition be photocurable, i.e., curable with ultraviolet radiation. Various sources of UV radiation are suitable, including electric powered arc lamps, such as medium pressure or high pressure mercury lamps; and electrodeless lamps; such as H-type, D-type, or V-type metal halide lamps. The specific radiation source should be selected to correspond with the absorption spectra of any photoinitiator. As an example, a UV radiation source operating at wavelengths of between 240 to 450 nm and an energy of 200 to 450 mj/cm$^2$ for 4 to 6 seconds would be preferable in the practice of the present invention.

Preferably, spin coating and/or curing occurs in an inert atmosphere. For example, an atmosphere comprising 90% or more nitrogen may be used.

The objects and advantages of the present invention are further illustrated by the following examples, but the particular materials and amounts thereof recited in these examples, as well as the conditions and details, should not be construed to unduly limit this invention.

EXAMPLE 1

This example describes sealcoat formulation samples 1–3, comprising a radiation curable component, a nonionic perfluoro surfactant, and a silicone-containing (meth)acrylate compound, and wherein both the nonionic perfluoro suffactant and the silicone-containing (meth)acrylate compound comprise a polyoxyalkylene segment.

The nonionic perfluoro surfactant designated "Surfactant A" and used in sample 1 was the copolymer derived from reacting about 30% by weight of the fluorinated monomer with about 70% by weight pluronic L 44 diacrylate, wherein x=12, y=21, and z=12. The pluronic L 44 diacrylate is prepared by reacting pluronic L 44 diol, having an average molecular weight of about 2200, and commercially available from BASF, with one equivalent of acrylic acid. Surfactant A can be produced by adding 3 grams of the above fluorinated monomer to 7 grams of the pluronic L 44 diacrylate, 5 grams of toluene, 0.5 grams of n-octylmercaptan and 0.1 grams of VAZO™ 64(2,2' azobisisobutyronitrile, commercially available from DuPont). The mixture is purged with nitrogen to remove oxygen, and reacted at 65 C. for 8–10 hours. In the present application, the copolymer was used at 100% solids.

For samples 2 and 3, the nonionic perfluoro surfactant was wherein x average is about 7.2, referred to herein as "Surfactant B."

The ingredients comprising the uncured sealcoat formulation were first compounded into admixtures, and then spin coated onto the aluminum optical recording layer of an optical recording disk. Table 1 recited the mounts of each ingredient used, in parts by weight. The ingredients were charged to a mixing container by the following procedure. A first charge of (meth)acrylate functional (reactive) diluent and the nonionic perfluoro suffactant was added to a mixing container. These two ingredients were shaken until a homogeneous solution was obtained (about 3–5 minutes). In a second charge, the multi-functional (meth)acrylate monomer TMPTA was added, followed by the multi-functional (meth)acrylate oligomers Eb 605 and Eb 80, the silicone-containing (meth)acrylate compound polydimethylsiloxane acrylate (RC 711), and the photoinitiators. The ingredients were shaken to form a uniform, homogeneous admixture.

The Control 1 sample was produced in the same manner, except it did not contain the nonionic perfluoro surfactant or the silicone-containing (meth)acrylate compound. The Control 2 sample was the sealcoat formulation commercially available from Dai Nippon, Inc. of Japan under the trade designation SD 17.

The viscosity of each sample was measured with a Brookfield viscometer with a UL adapter Model DV-II from Brookfield Engineering Laboratories, Inc., of Stoughton Mass. A Brookfield constant temperature bath was used to maintain the sample temperature at 25 C.+/-2 C.

Using a Convac laboratory coater from Convac of Vailhengen, Germany, the samples were spin coated onto the aluminum reflective layer of an optical recording disk. The admixtures were applied onto the disk surfaces by manual dispensing via a luer lock syringe fired with a 0.8 μm disposable filter at a dispensing speed of 30–40 rpm for 3–5 seconds, followed by a fast spinning cycle at 3000 rpm for 5 seconds. The coatings were subsequently cured by an ultraviolet radiation source to a "tack-free to touch" surface.

The surfaces of the cured coating were examined for cosmetic defects such as streaks, orange peels, and haze by visual and microscope inspections. All samples were found to be cosmetically acceptable. Also, the surface energy of the cured coatings were measured with calibrated surface energy pens purchased from Con-Trol-Cure, Inc., of Chicago Ill. For surface energy measurements below 23 dynes/cm, ethyl alcohol was used, which is known to have a surface energy of 23 dynes/cm at room temperature. Pencil hardness was measured according to ASTM D3363-74. A lower surface energy corresponds to higher abrasion resistance and therefore higher pencil hardness values. Results are given in Table 1.

TABLE 1

| | Sample 1 | Sample 2 | Sample 3 | Control 1 | Control 2 |
|---|---|---|---|---|---|
| HDODA | 32 | 25 | 40 | 40 | |
| TMPTA | 35 | 47.5 | 20 | 21 | |
| Eb 605 | 14 | 15 | 29 | 28 | |
| Eb 80 | 7 | | | | |
| RC 711 | 1 | 1 | 0.7 | | |
| Surfactant A | 1 | | | | |
| Surfactant B | | 0.5 | 0.3 | | |
| Darocure 4265 | 10 | | | | |
| Darocure 1173 | | | 5 | 6 | |
| Irgacure 184 | | 11 | 5 | 5 | |
| TEST RESULTS | | | | | |
| Viscosity (cps) at 25° C. | 59 | 40 | 43 | 43 | 35 |
| Pencil Hardness | 3–4H | 3H | 3H | 2H | 2H |
| Surface energy *(dynes/cm) | <23 | <23 | <23 | 32–35 | 28 |

Table 1 shows that samples that comprise the silicone-containing (meth)acrylate compound and the nonionic perfluoro suffactants of the present invention provide hardness and surface energy values that are an improvement over a control samples without these ingredients, and also over a commercial sealcoat formulation.

EXAMPLE 2

Example 2 describes formulations 4–7 which compare the effects of photoinitiators and tributyl amine on the aging characteristics of sealcoat formulations of the present invention. Sealcoat sample formulations 4–7 all comprise a nonionic perfluoro surfactant (Surfactant B), a silicone-containing (meth)acrylate compound (polydimethylsiloxane acrylate), and a photoinitiator. Sample 4 comprises a non-phosphine oxide photoinitiator (Irgacure 184), sample 5 comprises a nonphosphine oxide photoinitiators(Irgacure 184 and Darocure 1173) and additionally tributyl amine, sample 6 comprises a phosphine oxide photoinitiator (Darocure 4265), and sample 7 comprises a phosphine oxide photoinitiator (Darocure 4265) and additionally tributyl amine. See Table 2.

Samples 4–7 were produced according to Table 2, with amounts given in parts by weight. The samples were produced in the same manner as those in Example 1, except that the tributyl amine for samples 5 and 7 was also added in the second charge. The samples were coated and cured and tested for viscosity and pencil hardness in the same manner as Example 1.

TABLE 2

|  | Sample 4 | Sample 5 | Sample 6 | Sample 7 |
| --- | --- | --- | --- | --- |
| HDODA | 25 | 25 | 25 | 25 |
| TMPTA | 47 | 46 | 47 | 46 |
| Eb 605 | 15 | 15 | 15 | 15 |
| RC 711 | 0.5 | 0.5 | 0.5 | 0.5 |
| Surfactant A | 0.5 | 0.5 | 0.5 | 0.5 |
| Irgacure 184 | 12 | 5 |  |  |
| Darocure 1173 |  | 6 |  |  |
| Darocure 4265 |  |  | 12 | 12 |
| tributyl amine |  | 1 |  | 1 |
| Viscosity (cps) | 40 | 40 | 40 | 40 |
| Pencil Hardness | 2H | 2H | 2H | 2H |

The corrosion resistance of each cured sealcoat was evaluated by subjecting media coated with above sample formulations to accelerated humidity and temperature stress. After exposure to 90 C. and 95% relative humidity (R.H.) and 100 C. and 100% R.H., the samples were examined for corrosion sites. Table 3 summarized the results.

TABLE 3

|  | 90° C./95% R.H. for 400 hrs | 100° C./100% R.H. for 200 hrs. |
| --- | --- | --- |
| Sample 4 | numerous corrosion sites | numerous corrosion sites |
| Sample 5 | Some corrosion sites-less than the number of sites observed in sample 4 | Some corrosion sites-less than the number of sites observed in sample 4 |
| Sample 6 | few corrosion sites-much less than the number of sites observed in sample 5 | few corrosion sites-much less than the number of sites observed in sample 5 |
| Sample 7 | No corrosion sites | No corrosion sites |

Table 3 shows that the presence of an amine in the sealcoat formulations improves the corrosion sealcoat formulations ability to prevent corrosion of the reflective layer. The combination of a phosphine initiator and an amine provides the best results.

What is claimed is:

1. An optical recording disk having a sealcoat layer provided on at least one surface of the disk, wherein the sealcoat layer is a cured composition obtained from ingredients comprising
   a) a radiation-curable component;
   b) a nonionic perfluoro surfactant; and
   c) a radiation-curable silicone-containing compound; and wherein the nonionic perfluoro surfactant has the formula:

$$F_{2n+1}C_n(CH_2CH_2O)_xR^6$$

wherein $R^6$ is hydrogen or an alkyl group, n is in the range from 1 to 12, and x is in the range from 1 to 50.

2. The optical recording disk of claim 1, wherein the nonionic perfluoro surfactant has the formula:

$$F_{17}C_8(CH_2CH_2O)_{10}H.$$

3. The optical recording disk of claim 1, wherein the nonionic perfluoro surfactant has the formula:

$$\begin{array}{c}(C_2H_5)\\|\\C_8F_{17}SO_2N(CH_2CH_2O)_xCH_3\end{array}$$

wherein x is in the range from 1 to 20.

4. The optical recording disk of claim 1, wherein the radiation-curable component comprises
   a) a (meth)acrylate-functional diluent;
   b) a multi-functional (meth)acrylate monomer comprising three or more (meth)acrylate groups; and
   c) a multi-functional (meth)acrylate oligomer.

5. The optical recording disk of claim 4, wherein:
   the (meth)acrylate-functional diluent is a mono- or difunctional non-aromatic (meth)acrylate monomer;
   the a multi-functional (meth)acrylate oligomer has an average molecular weight in the range from 400 to 2000.

6. The optical recording disk of claim 4, wherein the radiation-curable component comprises:
   a) 20–40 parts by weight (meth)acrylate-functional diluent;
   b) 25–55 parts by weight multi-functional (meth)acrylate monomer comprising three or more (meth)acrylate groups; and
   c) 10–30 parts by weight multi-functional (meth)acrylate oligomer; based on 100 parts radiation-curable component.

7. The optical recording disk of claim 4, wherein the (meth)acrylate-functional diluent is chosen from the group consisting of: 1,6-hexanediol di(meth)acrylate, tripropylene glycol di(meth)acrylate, isobornyl (meth)acrylate, 2-(2-ethoxyethoxy) ethyl (meth)acrylate, tetrahydrofurfuryl (meth)acrylate, polyethylene glycol di(meth)acrylate, tripropylene glycol di(meth)acrylate, neopentyl glycol dialkoxy di(meth)acrylate, polyethyleneglycol di(meth)acrylate, and mixtures thereof.

8. The optical recording disk of claim 7, wherein the (meth)acrylate-functional diluent is 1,6-hexanediol di(meth)acrylate.

9. The optical recording disk of claim 4, wherein the multi-functional (meth)acrylate monomer comprising three or more (meth)acrylate groups is chosen from the group consisting of trimethylpropane tri(meth)acrylate, pentaerythritol tri(meth)acrylate, pentaerythritol tetra(meth)acrylate, ditrimethylolpropane tri(meth)acrylate, dipentaerythritol penta(meth)acrylate, dipentaerythritol hydroxy penta(meth)acrylate, glyceryl propoxy tri(meth)acrylate, trimethylolpropane tri(meth)acrylate, and mixtures thereof.

10. The optical recording disk of claim 9, wherein the multi-functional (meth)acrylate monomer comprising three or more (meth)acrylate groups is chosen from the group consisting of trimethyl propane tri(meth)acrylate, pentacrythritol tetra(meth)acrylate, glyceryl propoxy tri(meth)acrylate, trimethylolpropane tri(meth)acrylate, and mixtures thereof.

11. The optical recording disk of claim 4, wherein the multi-functional (meth)acrylate oligomer is chosen from the group consisting of polyester (meth)acrylates, polyurethane (meth)acrylates, and epoxy (meth)acrylates.

12. The optical recording disk of claim 4, wherein the multi-functional (meth)acrylate oligomer is chosen from the group consisting of: tetrafunctional acrylated polyester oligomer, polyester tetra-functional (meth)acrylate oligomer, multifunctional (meth)acrylated polyester oligomer, bisphenol A epoxy di(meth)acrylate, di(meth)acrylate oligomer, trifunctional acrylated polyester oligomer, trifunctional aromatic urethane acrylate oligomer, hexafunctional aliphatic urethane acrylate, difunctional aliphatic urethane acrylate oligomer, and mixtures thereof.

13. The optical recording disk of claim 4, wherein the multi-functional (meth)acrylate oligomer is chosen from the group consisting of: polyester tetra-functional (meth)acrylate oligomer, multi functional (meth)acrylated polyester oligomer, bisphenol A epoxy di(meth)acrylate, and mixtures thereof.

14. An optical recording disk having a sealcoat layer provided on at least one surface of the disk, wherein the sealcoat layer is a cured composition obtained from ingredients comprising a) a radiation-curable component;

b) a nonionic perfluoro surfactant; and c) a radiation-curable silicone-containing compound; and wherein the nonionic perfluoro surfactant has the formula:

$$F_{2n-1}C_nO(CH_2CH_2O)_xCH_3$$

wherein x is in the range from 10–20, and n is in the range from 3 to 18.

15. The optical recording disk of claim 14, wherein the nonionic perfluoro surfactant is:

$$C_9F_{17}O(CH_2CH_2O)_xCH_3$$

wherein x average is about 16.

16. An optical recording disk having a sealcoat layer provided on at least one surface of the disk, wherein the sealcoat layer is a cured composition obtained from ingredients comprising a) a radiation-curable component;

b) a nonionic perfluoro surfactant; and c) a radiation-curable silicone-containing compound; and wherein the nonionic perfluoro surfactant has the formula:

wherein $R^A$ is hydrogen or a methyl group; $X^1$ is a divalent linking group; $R^8$ is hydrogen or a lower alkyl having from 1–12 carbons; and n is in the range from 4 to 16.

17. The optical recording disk of claim 16, wherein $R^8$ is an ethyl or butyl group.

18. An optical recording disk having a sealcoat layer provided on at least one surface of the disk, wherein the sealcoat layer is a cured composition obtained from ingredients comprising a) a radiation-curable component;

b) a nonionic perfluoro surfactant; and c) a radiation-curable silicone-containing compound; and wherein the radiation-curable silicone containing compound comprises a polyoxyalkylene segment.

19. The optical recording disk of claim 18, wherein the radiation curable silicone-containing compound has the general formula:

(VI)

wherein $R^A$ is hydrogen or a methyl group, $R^S$ is hydrogen or an alkyl group, A is a hydroxy-containing divalent linking group, x is in the range from 1–9, y is in the range from 1–30, m, n, and p, are independently in the range from 1 to 10.

20. The optical recording disk of claim 19, wherein the radiation-curable silicone-containing compound has the general formula:

wherein $R^A$ is hydrogen or a methyl group, $R^S$ is hydrogen or an alkyl group, x is in the range from 1–9, y is in the range from 1–30, m, n, p, and r are independently in the range from 1 to 10.

21. The optical recording disk of claim 20, wherein the radiation-curable silicone-containing compound has the general formula:

wherein $R^A$ is hydrogen or a methyl group, $R^S$ is hydrogen or an alkyl group, x is in the range from 1–9, and y is in the range from 1–30.

22. The optical recording disk of claim 21, wherein the radiation-curable silicone-containing compound has the general formula:

wherein $R^A$ is hydrogen or a methyl group.

23. An optical recording disk having a sealcoat layer provided on at least one surface of the disk, wherein the sealcoat layer is a cured composition obtained from ingredients comprising:

a) 85 to 99 parts by weight of a radiation-curable component which comprises:

1,6-hexanediol di(meth)acrylate, trimethyl propane triacrylate, bisphenol A epoxydi(meth)acrylate, and tripropylene glycol di(meth)acrylate, b) 0.5–4 parts by weight of a nonionic perfluoro surfactant having the formula wherein x is in the range from about 5 to 8;

c) 0.5–5 parts by weight of a radiation-curable silicone-containing compound which is polydimethylsiloxane (meth)acrylate;

d) 4–12 pans by weight of a photoinitiator which is 2,4,6-(trimethylbenzoyldiphenyl phosphine)oxide; and e) about 1–7 parts by weight of a anticorrosive agent which is tributyl amine.

* * * * *

UNITED STATES PATENT AND TRADEMARK OFFICE
CERTIFICATE OF CORRECTION

PATENT NO.: 5,609,990
DATED: March 11, 1997
INVENTOR(S): Ha et al.

It is certified that error appears in the above-identified patent and that said Letters Patent is hereby corrected as shown below:

Col. 5, line 2, "EBB301" should be --Eb8301--.
Col. 5, line 5, "EB80" should be --Eb80--.
Col. 5, line 18, "pans" should be --parts--.
Col. 5, line 19, "suffactants" should be --surfactants--.
Col. 8, line 4, "suffactants" should be --surfactants--.
Col. 8, line 22, "($C_2H_5$" should be --($C_2H_5$)--.
Col. 9, line 47, "pans" should be --parts--.
Col. 10, line 26, "suffactant" should be --surfactant--.
Col. 10, line 51, "noodle" should be --needle--.
Col. 11, lines 20/21, "suffactant" should be --surfactant--.
Col. 11, line 61, "mounts" should be --amounts--.
Col. 11, line 65, "suffactant" should be --surfactant--.
Col. 12, line 60, "suffactants" should be --surfactants--.
Col. 14, line 35, "2040" should be --20-40--.
Col. 18, line 6, "pans" should be --parts--.

Signed and Sealed this

Ninth Day of June, 1998

Attest:

BRUCE LEHMAN

Attesting Officer

Commissioner of Patents and Trademarks